US006238810B1

(12) United States Patent
Strange et al.

(10) Patent No.: US 6,238,810 B1
(45) Date of Patent: May 29, 2001

(54) PROCESS FOR USING SURFACE ACTIVE AGENTS TO PRODUCE HIGH ETCH GAINS FOR ELECTROLYTIC CAPACITOR MANUFACTURING

(75) Inventors: Thomas Flavian Strange, Easley; Ralph Jason Hemphill, Liberty, both of SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 09/287,297

(22) Filed: Apr. 7, 1999

(51) Int. Cl.[7] .............................. B23H 9/00; B23P 9/00; H01G 9/042

(52) U.S. Cl. .................... 428/687; 205/684; 205/658; 205/676; 205/675; 361/509; 361/529

(58) Field of Search ..................... 205/658, 674, 205/684, 675, 676, 640; 252/500

(56) References Cited

U.S. PATENT DOCUMENTS

| 4,213,835 | 7/1980 | Fickelscher | 204/129.25 |
|---|---|---|---|
| 4,420,367 | 12/1983 | Locher | 156/651 |
| 4,474,657 | 10/1984 | Arora | 204/129.75 |
| 4,518,471 | 5/1985 | Arora | 204/129.1 |
| 4,549,944 | * 10/1985 | Pliefke | 205/674 X |
| 5,143,587 | * 9/1992 | Endoh et al. | 205/684 X |

* cited by examiner

Primary Examiner—Donald R. Valentine
(74) Attorney, Agent, or Firm—Steven M. Mitchell (57) ABSTRACT

A surface active, viscosity modifying agent is used to promote additional tunnel initiation during the etching of high purity cubicity anode foil, preferably aluminum anode foil, to render it suitable for use in electrolytic capacitors. The anode foil is etched in the electrolyte bath composition by passing a charge rough the bath, resulting in an anode foil having a higher capacitance than foils etched using known methods or etching compositions. The etched anode foil is suitable for use in an electrolytic capacitor.

22 Claims, 6 Drawing Sheets

PROCESS FOR USING SURFACE ACTIVE AGENTS TO PRODUCE HIGH ETCH GAINS FOR ELECTROLYTIC CAPACITOR MANUFACTURING

BACKGROUND OF THE INVENTION

1. Field of the Invention

The present invention relates to the use of a surface active agent that can also act as a viscosity modifier to promote the initiation of tunnels during the etching of high purity cubicity anode foil to render it suitable for use in electrolytic capacitors, and to such electrolytic capacitors.

2. Related Art

In known processes for etching aluminum foil, an electrolytic bath is used that contains sodium chloride or other salt, as well as sulfate based electrolytes. The etching is usually followed by treatment in nitric or hydrochloric acid.

U.S. Pat. No. 4,213,835 discloses a method for electrolytically etching an aluminum foil. This process involves a pari-potentiostatic etching technique using a constant anode potential in a traveling bath containing chloride ions. Foils are thus provided with tunnel densities greater than $10^7$ tunnels/cm$^2$ of foil surface.

U.S. Pat. No. 4,420,367 discloses a method for etching an aluminum foil for electrolytic capacitors by carrying out an electrolytic tunnel etching process in a first etching stage, as known in the art. Non-electrolytic chemical etching is then used for enlarging the tunnels in one or several additional etching steps. The method is preferably carried out in a halogen-free or chloride-free solution having nitrate ions, such as $HNO_3$ and/or $Al(NO_3)_3$.

U.S. Pat. Nos. 4,474,657, 4,518,471 and 4,525,249 disclose the etching of aluminum electrolytic capacitor foil by passing the foil through an electrolyte bath. The bath contains 3% hydrochloric acid and 1% aluminum as aluminum chloride. The etching is carried out under a direct current (DC) and at a temperature of 75° C. U.S. Pat. No. 4,474,657 is limited to the above single step. U.S. Pat. No. 4,518,471 adds a second step where the etched foil is treated in a similar bath with a lower current density and at a temperature of 80–82.5° C. U.S. Pat. No. 4,525,249 adds a different second step, where the etched foil is treated in a bath of 8% nitric acid and 2.6% aluminum as a nitrate, at a temperature of 85° C.

However, such methods or compositions, which maintain adequate metal strength and improve capacitance, are not efficient enough to be suitable for use in the commercial production of electrolytic capacitors.

SUMMARY OF THE INVENTION

The present invention provides improved methods and compositions for the etching of anode foils, resulting in increased tunnel initiation and tunnel length control, relative to known etching methods and compositions. This invention makes use of surface active, viscosity modifying agents to promote tunnel initiation during the etching process, as well to control the length, depth and width of the etched tunnels, resulting in improved capacitance and increased foil strength. The present invention describes an etch suitable for the making of high gain anode foil to support 150 to 700 Volts of oxide.

The present invention provides the novel use of surface active, viscosity modifying agents to promote additional tunnel initiation during the etching process by modifying the surface energy such that additional sites are energetically favorable, and modifying the transition point between laminar flow and turbulent flow (the Reynolds number) such that initiation sites are less disturbed by adjacent active tunnel growth sites. Known etch electrolytes do not include this feature, and tunnel initiation is 10% to 20% lower than with the use of the agents of the present invention. This increased tunnel initiation results in a foil having a much higher surface area, providing increased capacitance, relative to known etching methods and compositions.

Tunnel length control can be obtained by varying the concentration of the surface active, viscosity modifying agent used. A higher concentration results in shorter tunnel lengths, producing a thicker web in the center of the foil (i.e., a larger amount of foil left behind in the center of the foil after tunnel initiation). This thicker web provides for an overall increase in foil strength, relative to known etching methods and compositions.

Surface active, viscosity modifying agents according to the present invention include but are not limited to the alcohols, specifically the diols such as ethylene glycol, glycerol, and butoxyethanol (butyl cellosolve). Other agents known to be surface active include: diacetin, propylene glycol, and butyrolactone. These agents are added in concentrations of 0.5% to 50% by weight to the etch electrolyte and the anode foil is etched in a manner known to those skilled in the art.

Accordingly, the present invention provides improved methods and compositions for etching anode foil, as well as electrolytic capacitors comprising this foil.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE INVENTION

The present invention provides improved methods and compositions for the etching of anode foils, resulting in increased tunnel initiation and tunnel length control, relative to known etching methods and compositions. This invention makes use of surface active, viscosity modifying agents to promote tunnel initiation during the etching process, as well to control the length, depth and width of the etched tunnels. As a result of increased tunnel initiation and improved tunnel length control, the present invention can be utilized to produce etched anode foils having improved capacitance and/or increase foil strength.

Several factors contribute to the specific capacitance and strength of electrolytic capacitor foil. One factor affecting increased capacitance is tunnel density (i.e., the number of tunnels per square centimeter). As tunnel density is increased, a corresponding enlargement of the overall surface area will occur. Larger surface area results in higher overall capacitance. A factor contributing to increased strength of electrolytic capacitor foil is the thickness of the web in the center of the foil (i.e., the amount of foil left behind in the center of the foil after tunnel initiation). As tunnel density is decreased in the center of the a foil, a corresponding enlargement of the overall foil strength will occur. The thicker the web, the stronger the foil. These factors can be controlled through the use of a surface active, viscosity modifying agent according to the present invention. In the method of the present invention, the foil can be etched anodically under the influence of an electrical charge in an electrolyte bath. The electrical charge can be provided by either a direct current (DC) or alternating current (AC) as is known by those skilled in the art. The use of a DC charge will be discussed below. A surface active, viscosity modifying agent, for example, glycerol, is added in concentrations of 0.5% to 50% by weight to an electrolyte containing 1.5% sodium chloride by weight, 3.5% sodium perchlorate by weight, and 0.5% by weight of a suitable oxidizing agent, for example sodium persulfate. Alternatively, ethylene glycol or butoxyethanol (butyl cellosolve) can be used in this manner in place of glycerol, at equivalent concentrations. A surface active, viscosity modifying agent concentration of 0.5% to 10% is preferred for increased capacitance, with about 3% more preferred, whereas a concentration of 40% to 50% is preferred for increased foil strength, with about 45% more preferred. The electrolyte is heated to 80–95° C., with about 85° C. preferred.

The foil (a high purity, high cubicity etchable strip as supplied by vendors known to those in the art) is inserted and etched at a DC charge density of about 0.1–0.4 A/cm$^2$ (amps per square centimeter), with about 0.15 A/Cm$^2$ preferred. The etching can be carried out with an etching charge of about 20 to 100 coulombs/cm$^2$, with about 50 coulombs/cm$^2$ preferred, which requires a time of about 2 minutes and 13 seconds to 11 minutes and 7 seconds, with about 5 minutes and 30 seconds preferred. The etch tunnels created during this process are then widened to an appropriate diameter, by methods known to those in the art, such as that disclosed in U.S. Pat. No. 4,518,471 to Arora and U.S. Pat. No. 4,525,249 to Arora, entirely incorporated herein by reference.

With the addition of low concentrations of a surface active, viscosity modifying agent, the resulting foil has similar mechanical strength to foil etched without the addition of a surface active agent, but has a much higher surface area, as measured by capacitance. Higher concentrations of the surface active, viscosity modifying agent result in shorter tunnel lengths, producing a thicker web in the center of the foil (i.e., a larger amount of foil left behind in the center of the foil after tunnel initiation). This thicker web provides for an overall increase in foil strength, relative to known etching methods and compositions.

The process of the present invention results in a very efficient and economical etching process that can yield capacitance values and foil strengths equal to or significantly higher than available foils, without requiring major changes in existing production machinery.

Foils etched in accordance with the present invention can be used in high voltage electrolytic capacitors and can yield a significantly higher specific capacitance per square centimeter than previously obtained. As a result of increased surface area, to obtain a given capacitance, the capacitor can have a smaller volume or, for the same volume, can have a higher capacitance. Etch gains result in at least about 10–30% higher capacitance using this method than under previous known methods.

In addition, foils etched in accordance with the present invention can be used in high voltage capacitors and exhibit significantly higher foil strength than previously obtained. As tunnel density is decreased in the center of the foil, a corresponding enlargement of the overall foil strength will occur.

The foil used for etching according to the present invention is preferably etchable aluminum strip of high cubicity. High cubicity in the context of the present invention is where at least 85% of crystalline aluminum structure is oriented in a normal position (i.e., a (1,0,0) orientation) relative to the surface of the foil. The foil used for etching is also preferably of high purity. Such foils are well-known in the art and are readily available from commercial sources.

The present invention thus also provides electrolytic capacitors comprising etched anode foil etched by methods and/or compositions according to the present invention. Such capacitors can be made using any suitable method known in the art. Non-limiting examples of such methods are disclosed, e.g., in the following references which are entirely incorporated herein by reference: U.S. Pat. Nos. 4,696,082 to Fonfria et al., 4,663,824 to Kemnochi, 3,872,579 to Papadopoulos, 4,541,037 to Ross et al., 4,266,332 to Markarian et al., 3,622,843 to Vermilyea et al., and 4,593,343 to Ross.

While the above description and following examples are directed to an embodiment of the present invention where a surface active agent, according to the present invention, is added to an etch electrolyte based on an aqueous solution of chloride salts, to improve the capacitance or increase the strength of an etched aluminum anode foil, a surface active agent, according to the present invention, can be applied to other etch electrolytes to increase the capacitance of other anode foils known to those skilled in the art. For example, the process according to the present invention can be used to increase the capacitance or increase the strength of valve metal anode foils, such as tantalum, titanium, and columbium (niobium). A surface active agent, according to the present invention, can be added to an appropriate etch electrolyte for these other anode foils, such as one from the category of largely non-aqueous electrolytes, such as bromenated methanol, or any of the halogenated alcohol family, such as iodine, bromine, etc.

Having now generally described the invention, the same will be more readily understood through reference to the following examples which are provided by way of illustration, and are not intended to be limiting of the present invention.

EXAMPLE 1

In each of the examples below, a similar etching and widening process according to the present invention was used. The following etching and widening process is provided by way of example.

Using the above description, an etching solution of 1.3% sodium chloride and 3.5% sodium perchlorate by weight was used in the etching tanks. Before the foil was etched by introduction into the etching tank, a weight of 360 grams of glycerol (as a surface active, viscosity modifying agent) was added to the tank (not the cathode boxes), followed by a weight of 200 grams of deionized (DI) water, added with the beaker that was used to add the glycerol. The glycerol was then mixed into solution as much as possible. The rinse was then added to the tank along with a solution of 45 grams of sodium persulfate (as an oxidizing agent) and 345.2 grams DI water by weight (mixed first and then added to the tank). The resulting solution contained 20 liters of an etching solution of 1.3% sodium chloride and 3.5% sodium perchlorate by weight.

A weight of 75 grams sodium persulfate was then added to a weight of 600 grams of glycerol, followed by an equal volume of DI water. This solution was used to add to the tank during etching as the solution level dropped.

The time for the etch process was about five minutes and the charge density was set to 0.15 A/cm$^2$. The temperature was maintained between about 83° C. and 86° C. Foil holders were used for this process. The clips were not in the solution during etching, and the level of the solution was kept high enough to cover the top row of anodes.

The foils were widened in a 10.6% aluminum nitrate solution by weight with nitric acid added as 25 mL of 70%, by weight, of stock solution (a weight of 24.85 grams of nitric acid) at the beginning of widening and again after 10 foils had been widened. The foils were widened for eight minutes and thirty-eight seconds, and the temperature remained between 68° C. and 72° C. The charge density was set at 0.15 A/cm$^2$ for the widening procedure. An oxide to support 445 Volts was formed on the foil samples by way of techniques known to those skilled in the art.

EXAMPLE 2

Using a method similar to that presented in Example 1, the following table lists the components, conditions and results for an etching process according to the present invention.

Etch Solution Study (Table 1)

| Etch Solution | Surface Area: |
|---|---|
| 5% NaClO$_4$ | 254 cm$^2$ |
| 0.35% Na$_2$S$_2$O$_8$ | Current Density |
| 5% Glycerol | 0.15 A/cm$^2$ |
| 2.0%–2.8% NaCl | 37.5 A |

| Sample # | Etching Charge (coulombs/cm$^2$) | Etch Time | % NaCl | Δ Weight (g) | Oxidation potential begin (mV) | endline (mV) |
|---|---|---|---|---|---|---|
| 110 | 40 | 4'26" | 2.0% | 2.8954 | 274 | 203 |
| 111 | 45 | 5' | 2.0% | 3.0133 | 219 | 207 |
| 110 | 50 | 5'33" | 2.0% | 3.1538 | 223 | 206 |
| 114 | 45 | 5' | 2.2% | 2.9926 | 218 | 204 |
| 115 | 40 | 4'26" | 2.2% | 2.8828 | 218 | 202 |
| 116 | 40 | 4'26" | 2.4% | 2.8765 | 221 | 192 |
| 117 | 45 | 5' | 2.4% | 3.0152 | 213 | 200 |
| 118 | 50 | 5'33" | 2.4% | 3.1278 | 220 | 204 |
| 119 | 50 | 5'33" | 2.6% | 3.1420 | 225 | 191 |
| 120 | 45 | 5' | 2.6% | 3.0083 | 175 | 168 |
| 121 | 40 | 4'26" | 2.6% | 2.8264 | 181 | 174 |
| 122 | 40 | 4'26" | 2.8% | 2.8778 | 222 | 177 |
| 123 | 45 | 5' | 2.8% | 2.9517 | 179 | 164 |
| 124 | 50 | 5'33" | 2.8% | 3.1207 | 182 | 207 |

Etch Solution Study (Table 2)

| Sample # | Voltage | Temp (° C.) | Weight (g) Initial | Final |
|---|---|---|---|---|
| 110 | 8.0 | 83.9 | 11.4696 | 8.5742 |
| 111 | 7.8 | 84.5 | 11.5042 | 8.4909 |
| 112 | 7.6 | 83.8 | 11.3886 | 8.2348 |
| 113 | 7.5 | 84.4 | 11.3738 | 8.2181 |
| 114 | 9.6 | 85.1 | 11.3084 | 8.3158 |
| 115 | 11.8 | 85.3 | 11.2431 | 8.3603 |
| 116 | 13.1 | 85.2 | 11.2502 | 8.3737 |
| 117 | 15.4 | 88.9 | 11.2084 | 8.1932 |
| 118 | 16.5 | 85.7 | 11.3207 | 8.1929 |
| 119 | 16.7 | 85.0 | 11.2495 | 8.1075 |
| 120 | 17.0 | 85.1 | 11.3749 | 8.3666 |
| 121 | 16.6 | 85.0 | 11.4714 | 8.6450 |
| 122 | 15.8 | 84.5 | 11.3398 | 8.4620 |
| 123 | 15.7 | 84.6 | 11.2895 | 8.3378 |
| 124 | 15.1 | 84.7 | 11.2942 | 8.1735 |

The conditions potential reading may be in error at the end of the study due to the probes not being in the solution due to evaporation (samples 122 to 124).

Widening of Foils from Etching Solution Study (Table 3)
Temperature: 68–72° C.    Time: 8'38"

| Sample # | Voltage Beginning | End | Temp (° C.) Beginning | End |
|---|---|---|---|---|
| 110 | 4.5 | 4.3 | 68.7 | 70.8 |
| 111 | 4.7 | 4.4 | 70.3 | 70.9 |
| 112 | 4.9 | 4.5 | 70.3 | 70.8 |
| 113 | 4.8 | 4.5 | 70.3 | 70.8 |
| 114 | 5.0 | 4.6 | 70.2 | 70.7 |
| 115 | 5.1 | 4.7 | 70.1 | 70.8 |
| 116 | 5.4 | 4.8 | 70.2 | 70.7 |
| 117 | 5.6 | 4.7 | 70.2 | 70.8 |
| 118 | 5.4 | 4.8 | 70.3 | 70.8 |
| 119 | 5.5 | 4.9 | 70.3 | 70.9 |
| 120 | 6.0 | 5.0 | 68.0 | 69.8 |
| 121 | 5.8 | 5.0 | 69.8 | 70.7 |
| 122 | 5.8 | 5.1 | 70.3 | 71.1 |
| 123 | 5.9 | 5.1 | 70.5 | 71.1 |
| 124 | 5.6 | 5.0 | 70.6 | 71.2 |

Formation of Etching Study (Table 4)

| Sample # | Capacitance ($\mu$F/cm$^2$) | Forming Time |
|---|---|---|
| 110 | 1.319 | 1:19:08 |
| 111 | 1.335 | 1:23:20 |
| 112 | 1.374 | 1:24:51 |
| 113 | 1.295 | 1:20:39 |
| 114 | 1.287 | 1:14:41 |
| 115 | 1.228 | 1:24:50 |
| 116 | I.146 | 1:05:52 |
| 117 | 1.142 | 1:05:59 |
| 118 | 1.205 | 1:06:16 |
| 119 | 1.106 | 1:03:45 |
| 120 | 1.043 | 59:29 |
| 121 | 1.047 | 55:03 |
| 122 | 0.996 | 55:45 |
| 123 | 0.933 | 52:06 |
| 124 | 0.984 | 54:52 |

EXAMPLE 3

Using a method similar to that as presented in Example 1, the following table lists the components and results for an etching process according to the present invention.

Etching Solution Study (Table 5)

Etch Solution

5% NaClO$_4$ 0.35% Na$_2$S$_2$O$_8$
5% Glycerol 1.0%–2.0% NaCl

Temperature:

85° C.

Current Density 0.15 A/cm$^2$

| Sample # | Etching Charge (coulombs/cm$^3$) | Etch Time | % NaCl | Cap (μF/cm$^2$) | Wt$_{init}$(g)/Wt$_{final}$(g)/Wt$_{loss}$(g) | Time to Form |
|---|---|---|---|---|---|---|
| 125 | 45 | 5' | 1.0 | 1.161 | 11.2502/8.2215/3.029 | 1:04 |
| 126 | 50 | 5'33" | 1.0 | 1.201 | 11.3055/8.1551/3.1504 | 1:06 |
| 127 | 50 | 5'33" | 1.2 | 1.299 | 11.3754/8.2249/3.1504 | 1:11 |
| 128 | 45 | 5' | 1.2 | 1.228 | 11.2723/8.2566/3.0157 | 1:07 |
| 129 | 45 | 5' | 1.4 | 1.287 | 11.2258/8.2008/3.025 | 1:10 |
| 130 | 50 | 5'33" | 1.4 | 1.299 | 11.2579/8.1060/3.1519 | 1:10 |
| 131 | 50 | 5'33" | 1.6 | 1.248 | 11.4214/8.2716/3.1498 | 1:10 |
| 132 | 45 | 5' | 1.6 | 1.232 | 11.4152/8.4052/3.0100 | 1:10 |
| 133 | 45 | 5' | 1.8 | 1.224 | 11.3721/8.3647/3.0074 | 1:10 |
| 134 | 50 | 5'33" | 1.8 | 1.280 | 11.2052/8.0603/3.1449 | 1:10 |
| 135 | 50 | 5'33" | 2.0 | 1.252 | 11.2459/8.0907/3.1552 | 1:07 |
| 136 | 45 | 5' | 2.0 | 1.185 | 11.2865/8.2696/3.0169 | 1:04 |

*20% NaCl was used to increase the concentration by increments of 0.2%, in this case using 129 mL.
*Widened and Formed using standard solution and procedure.

EXAMPLE 4

Using a method similar to that as presented in Example 1, the following table lists the components and results for an etching process according to the present invention.

Etching Solution Study (Table 6)
3.5% NaClO$_4$, 1.3% NaCl and .375% Na$_2$S$_2$O$_8$
Widened and Formed at Standard Procedure
Current Density of .15 A/cm$^2$

| Sample # | Etching Charge (coulombs/cm$^2$) | Etch Time | % Glycerol | Wt (init)(g) | Wt (final) (g) | Wt loss (g) | Cap (μF/cm$^2$) | Time to Form |
|---|---|---|---|---|---|---|---|---|
| 137 | 45 | 5' | 0 | 11.4803 | 8.4574 | 3.0229 | 1.382 | 1:18 |
| 138 | 50 | 5'33" | 0 | 11.5400 | 8.3441 | 3.1959 | 1.429 | 1:23 |
| 139 | 50 | 5'33" | 1 | 11.4910 | 8.3560 | 3.1350 | 1.398 | 1:21 |
| 140 | 45 | 5' | 1 | 11.3789 | 8.3602 | 3.0187 | 1.390 | 1:22 |
| 141 | 45 | 5' | 2 | 11.3376 | 8.3106 | 3.0270 | 1.394 | 1:19 |
| 142 | 50 | 5'33" | 2 | 11.3699 | 8.2094 | 3.1605 | 1.413 | 1:24 |
| 143 | 50 | 5'33" | 3 | 11.4347 | 8.2753 | 3.1594 | 1.429 | 1:21 |
| 144 | 45 | 5' | 3 | 11.3486 | 8.3255 | 3.0231 | 1.343 | 1:17 |
| 145 | 45 | 5' | 4 | 10.8628 | 7.8376 | 3.0252 | 1.366 | 1:18 |
| 146 | 50 | 5'33" | 4 | 11.2737 | 8.1210 | 3.1527 | 1.398 | 1:22 |
| 147 | 50 | 5'33" | 5 | 11.3406 | 8.1938 | 3.1462 | 1.402 | 1:22 |
| 148 | 45 | 5' | 5 | 11.2890 | 8.2565 | 3.0325 | 1.343 | 1:18 |

*Cathode box (top) contained 2722.7 g of etch solution. Cathode box (bottom) contained 2737.6 g of etch solution. The tank had 11,982.6 g of etch solution.
*Added Na$_2$S$_2$O$_8$ 20% solution.
*Added Glycerol to change 1% in etch solution.

EXAMPLE 5

Using a method similar to that as presented in Example 1, the following table lists the components and results for an etching process according to the present invention.

Etch Solution Study (Table 7)
3.5% NaClO$_4$, 1.3% NaCl and 0.375% Na$_2$S$_2$O$_8$
3.0% Glycerol
all into the production etch solution
Foils surface area = 254 cm$^2$

| Sample # | Weight Loss(g) | Capacitance (μF/cm$^2$) | Yield # |
|---|---|---|---|
| 713 | 3.3026 | 1.398 | 3 |
| 714 | 3.2458 | 1.469 | 3 |
| 715 | 3.3086 | 1.398 | 4 |
| 716 | 3.2360 | 1.441 | 1 |
| 717 | 3.2810 | 1.374 | 3 |
| 718 | 3.2145 | 1.394 | 1 |
| 719 | 3.2713 | 1.366 | 1 |
| 720 | 3.2269 | 1.413 | 0 |
| 721 | 3.2650 | 1.339 | 3 |
| 722 | 3.180 | 1.413 | 6 |
| 723 | 3.0006 | 1.350 | 1 |
| 724 | 3.193 | 1.457 | 4 |
| 725 | 3.2439 | 1.366 | 2 |
| 726 | 3.1773 | 1.449 | 3 |
| 727 | 3.2339 | 1.390 | 2 |
| 728 | 3.1789 | 1.437 | 5 |
| 729 | 3.2270 | 1.409 | 6 |
| 730 | 3.1796 | 1.358 | 3 |
| 731 | 3.2180 | 1.343 | 2 |
| 732 | 3.1655 | 1.406 | 7 |
| 733 | 3.2222 | 1.382 | 2 |
| 734 | 3.1621 | 1.413 | 6 |
| 735 | 3.2060 | 1.366 | 8 |
| 736 | 3.1552 | 1.402 | 6 |
| 737 | 3.2050 | 1.350 | 5 |
| 738 | 3.1573 | 1.340 | 7 |
| 739 | 3.1671 | 1.303 | 8 |
| 740 | 3.1586 | 1.350 | 9 |

-continued

Etch Solution Study (Table 7)
3.5% NaClO$_4$, 1.3% NaCl and 0.375% Na$_2$S$_2$O$_8$
3.0% Glycerol
all into the production etch solution
Foils surface area = 254 cm$^2$

| Sample # | Weight Loss(g) | Capacitance ($\mu$F/cm$^2$) | Yield # |
|---|---|---|---|
| 741 | 3.0520 | 1.311 | 6 |
| 742 | 2.6642 | 1.343 | 9 |
| 743 | 2.8541 | 1.343 | 8 |

*All foils were widened at Standard Procedure widening. Average yield = 4.32/sheet to 0.30 Amps, 31 sheets used

EXAMPLE 6

Using a method similar to that as presented in Example 1, the following table lists the components and results for an etching process according to the present invention.

Etching Study with Etch Solution (150 foils) (Table 8)

| Etch Solution | Surface Area: |
|---|---|
| 3.5% NaClO$_4$ | 254 cm$^2$ |
| 0.375% Na$_2$S$_2$O$_8$ | Current Density |
| 3.0% Glycerol | 0.15 A/cm$^2$ |
| 1.3% NaCl | 37.5 A |
| Etch Procedure | Formation Procedure |
| 45 Coulombs/cm$^2$ for 5 min at 85° C. | Hydration formation; 1$^{st}$ reform; |
| | 2$^{nd}$ reform; 3$^{rd}$ reform (2%, 2 min); |
| | 4$^{th}$ reform, test. |
| | Heat treat at 450° C. for 3 min., |
| | 5% ADP 90° C. |

| Sample # | Weight Loss (g) | Cap ($\mu$F/cm$^2$) | Yield |
|---|---|---|---|
| 770 | 3.6791 | 1.374 | **** |
| 771 | 3.0407 | 1.378 | 0 |
| 772 | 3.0497 | 1.374 | **** |
| 773 | 3.0383 | *** | **** |
| 774 | 3.0676 | 1.382 | 2 |
| 775 | 3.0508 | 1.394 | **** |
| 776 | 3.3259 | 1.236 | 0 |
| 777 | 3.3781 | 1.303 | 0 |
| 778 | 3.2955 | 1.350 | 1 |
| 779 | 3.2661 | 1.343 | 4 |
| 780 | 3.3813 | 1.354 | 0 |
| 781 | 3.0546 | 1.343 | 2 |
| 782 | 3.0445 | 1.339 | **** |
| 783 | 3.0432 | 1.417 | **** |
| 784 | 3.0283 | 1.335 | 3 |
| 785 | 3.0297 | 1.339 | 1 |
| 786 | 3.0227 | 1.307 | **** |
| 787 | 3.0271 | **** | 5 |
| 788 | 3.6288 | 1.335 | 4 |
| 789 | 3.0243 | **** | **** |
| 790 | 3.0252 | 1.358 | **** |
| 791 | 3.0294 | 1.339 | 2 |
| 792 | 3.0177 | 1.264 | 0 |
| 793 | 3.0200 | 1.374 | 4 |
| 794 | 3.0376 | 1.331 | 2 |
| 795 | 3.0457 | *** | **** |
| 796 | 3.0191 | 1.303 | 2 |
| 797 | 3.0333 | 1.307 | 4 |
| 798 | 3.0322 | *** | 0 |
| 799 | 3.0771 | 1.374 | 7 |
| 800 | 3.0307 | 1.283 | 4 |
| 801 | 3.3447 | 1.374 | 4 |
| 802 | 3.0222 | 1.358 | 1 |
| 803 | 3.0273 | 1.331 | 3 |
| 804 | 3.0245 | 1.299 | 0 |
| 805 | 3.0335 | 1.311 | **** |
| 806 | 3.0701 | 1.335 | 0 |
| 807 | 3.1008 | 1.350 | 10 |
| 808 | 3.0544 | 1.323 | **** |
| 809 | 3.0516 | 1.315 | 0 |
| 810 | 3.0689 | **** | 2 |
| 811 | 3.0708 | 1.335 | **** |
| 812 | 3.0096 | 1.287 | 3 |
| 813 | 3.0260 | 1.335 | **** |
| 814 | 3.0084 | 1.240 | 2 |
| 815 | 2.9971 | 1.315 | 2 |
| 816 | 2.9978 | 1.343 | **** |
| 817 | 3.0238 | 1.343 | 7 |
| 818 | 3.0301 | 1.295 | 9 |
| 819 | 3.0387 | 1.378 | 8 |
| 820 | 3.0210 | 1.319 | 2 |
| 821 | 3.0113 | 1.343 | 8 |
| 822 | 3.0231 | 1.311 | 4 |
| 823 | 7.0221 | 1.354 | 10 |
| 824 | 3.0217 | 1.232 | 6 |
| 825 | 2.9891 | 1.315 | 6 |
| 826 | 2.9661 | 1.303 | 3 |
| 827 | 2.9332 | 1.406 | 9 |
| 828 | 2.9897 | 1.311 | 7 |
| 829 | 3.06418 | 1.291 | 5 |
| 830 | 7.0541 | 1.169 | 10 |
| 831 | 3.11602 | 1.295 | 7 |
| 832 | 3.0451 | 1.252 | **** |
| 873 | 3.0845 | 1.303 | 3 |
| 834 | 3.0317 | 1.350 | 3 |
| 835 | 3.0367 | 1.280 | 2 |
| 876 | 3.0871 | 1.366 | 5 |
| 837 | 3.0557 | 1.335 | **** |
| 838 | 3.0732 | 1.354 | **** |
| 839 | 3.0482 | 1.276 | 8 |
| 840 | 3.0736 | 1.343 | **** |
| 841 | 3.0431 | 1.346 | 0 |
| 842 | 3.0689 | 1.307 | **** |
| 847 | 3.0460 | 1.343 | 4 |
| 844 | 3.0319 | 1.346 | 5 |
| 845 | 3.0410 | 1.291 | 3 |
| 846 | 3.0300 | 1.358 | 5 |
| 847 | 3.0274 | 1.268 | **** |
| 848 | 3.0534 | 1.378 | 0 |
| 849 | 3.0455 | 1.350 | 4 |
| 850 | 3.0410 | 1.429 | 7 |
| 851 | 3.0391 | 1.346 | 5 |
| 852 | 3.0358 | 1.425 | 8 |
| 853 | 3.0369 | 1.366 | 2 |
| 854 | 3.0617 | 1.465 | 9 |
| 855 | 3.0755 | 1.390 | **** |
| 856 | 3.0474 | 1.374 | 2 |
| 857 | 3.0571 | 1.291 | 4 |
| 858 | 3.0380 | 1.378 | 0 |
| 859 | 3.0526 | 1.370 | 8 |
| 860 | 2.8944 | 1.374 | 1 |
| 861 | 2.9246 | 1.323 | 3 |
| 862 | 3.0069 | 1.311 | 4 |

-continued

Etching Study with Etch Solution (150 foils) (Table 8)

| Etch Solution | Surface Area: |
|---|---|
| 3.5% NaClO₄ | 254 cm² |
| 0.375% Na₂S₂O₈ | Current Density |
| 3.0% Glycerol | 0.15 A/cm² |
| 1.3% NaCl | 37.5 A |
| Etch Procedure | Formation Procedure |
| 45 Coulombs/cm² for 5 min at 85° C. | Hydration formation; 1ˢᵗ reform; 2ⁿᵈ reform; 3ʳᵈ reform (2%, 2 min); 4ᵗʰ reform, test. Heat treat at 450° C. for 3 min., 5% ADP 90° C. |

| Sample # | Weight Loss (g) | Cap (µF/cm²) | Yield |
|---|---|---|---|
| 863 | 3.0219 | 1.331 | 6 |
| 864 | 3.0285 | 1.350 | 4 |
| 865 | 2.973 | 1.331 | 7 |
| 866 | 3.0183 | 1.362 | 0 |
| 867 | 3.0301 | 1.331 | 3 |
| 868 | 2.9434 | 1.413 | 3 |
| 869 | 2.8876 | 1.350 | **** |
| 870 | 3.0013 | 1.390 | 4 |
| 871 | 3.0215 | 1.323 | 8 |
| 872 | 3.0269 | 1.343 | **** |
| 873 | 3.0290 | 1.390 | 7 |
| 874 | 2.9934 | 1.327 | 2 |
| 875 | 2.9832 | 1.331 | 7 |
| 876 | 2.9469 | 1.366 | **** |
| 877 | 2.9942 | 1.323 | 6 |
| 878 | 3.0165 | 1.354 | 6 |
| 879 | ** | 1.319 | **** |
| 880 | ** | 1.366 | 8 |
| 881 | ** | 1.283 | 6 |
| 882 | ** | 1.335 | 3 |
| 883 | 3.0142 | *** | 8 |
| 884 | 3.0299 | 1.335 | 5 |
| 885 | 3.0367 | 1.339 | 7 |
| 886 | 3.0801 | 1.406 | 7 |
| 887 | 3.6277 | 1.311 | **** |
| 888 | 3.0213 | 1.390 | **** |
| 889 | 3.0218 | 1.362 | 11 |
| 890 | 2.9620 | 1.413 | 7 |
| 891 | 2.9687 | *** | **** |
| 892 | 2.9294 | 1.382 | 9 |
| 893 | 2.8856 | 1.343 | 12 |
| 894 | 2.8584 | 1.299 | 12 |
| 895 | 2.8885 | 1.323 | 7 |
| 896 | 3.0104 | 1.319 | **** |
| 897 | 3.0100 | *** | 7 |
| 898 | 2.9947 | 1.323 | **** |
| 899 | 2.9949 | 1.307 | 8 |
| 900 | 2.9770 | 1.327 | 9 |
| 901 | 2.9944 | 1.311 | 11 |
| 902 | 2.9664 | 1.358 | 7 |
| 903 | 2.8991 | 1.272 | 11 |
| 904 | 2.8981 | 1.311 | 9 |
| 905 | 2.9609 | 1.307 | 9 |
| 906 | 2.9327 | 1.291 | 3 |
| 907 | 2.9198 | 1.295 | 10 |
| 908 | 2.0093 | 1.287 | **** |
| 909 | 3.0159 | 1.276 | 10 |
| 910 | 2.2586 | 1.299 | 10 |
| 911 | 3.0022 | 1.256 | 10 |
| 912 | 2.9877 | 1.307 | 3 |
| 913 | 3.0077 | 1.335 | 6 |
| 914 | 3.0038 | 1.280 | 8 |
| 915 | 3.0131 | 1.283 | 9 |
| 916 | 2.9813 | 1.248 | 8 |
| 917 | 2.9957 | 1.276 | 5 |
| 918 | 2.8956 | 1.252 | 4 |
| 919 | 3.0041 | 1.276 | 8 |

**Weight Loss measurements were not taken for these samples.
***Capacitance measurements were not taken for these samples.
****Yield measurements were not taken for these samples.

EXAMPLE 7

Using a method similar to that as presented in Example 1, the following table lists the components and results for an etching process according to the present invention. Aluminum foil samples were etched in a halide containing solution similar to Example 1 with increasing percent glycerol by weight. The foils were etched at a temperature of 90° C., a charge of 25 Coulombs/cm², and a current density of 0.15 amps/cm². The glycerol percentage by weight was increased from 0% to 40% by the intervals indicated in Table 9. Foils were widened and fonned using standard solution and procedure, as described in Example 1, yielding a 260 Volt oxide. Table 9 shows the capacitance and dissipation factor (Tan D) values for each glycerol percentage.

Etching Solution Study (Table 9)

| % Glycerol | Cap (µF/cm²) | Dissipation Factor |
|---|---|---|
| 0 | 1.180 | 0.062 |
| 5 | 1.204 | 0.054 |
| 10 | 1.271 | 0.040 |
| 20 | 1.320 | 0.047 |
| 30 | 1.066 | 0.049 |
| 40 | 1.145 | 0.059 |

Figure 1:
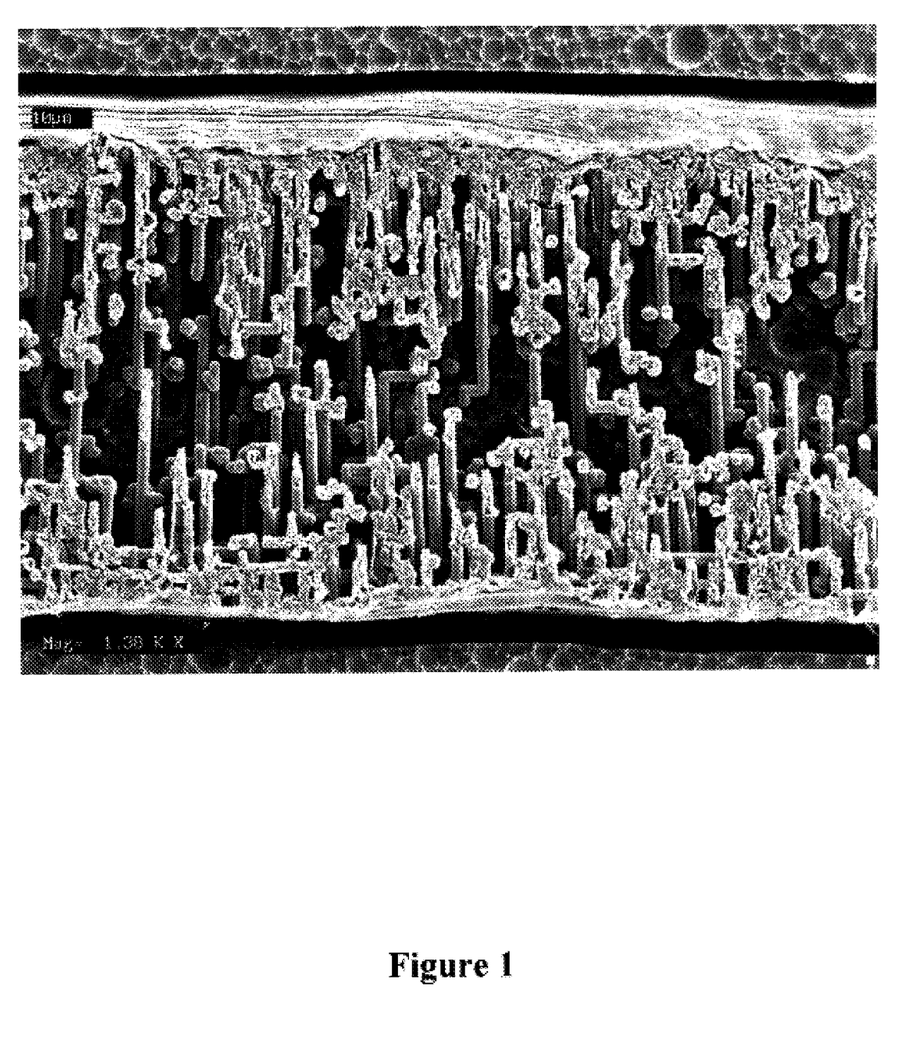
FIG. 1 shows a Scanning Electron Microscope (SEM) picture of a cross-section of a foil etched according to the present invention in an etch solution having 0% glycerol.
Figure 2:
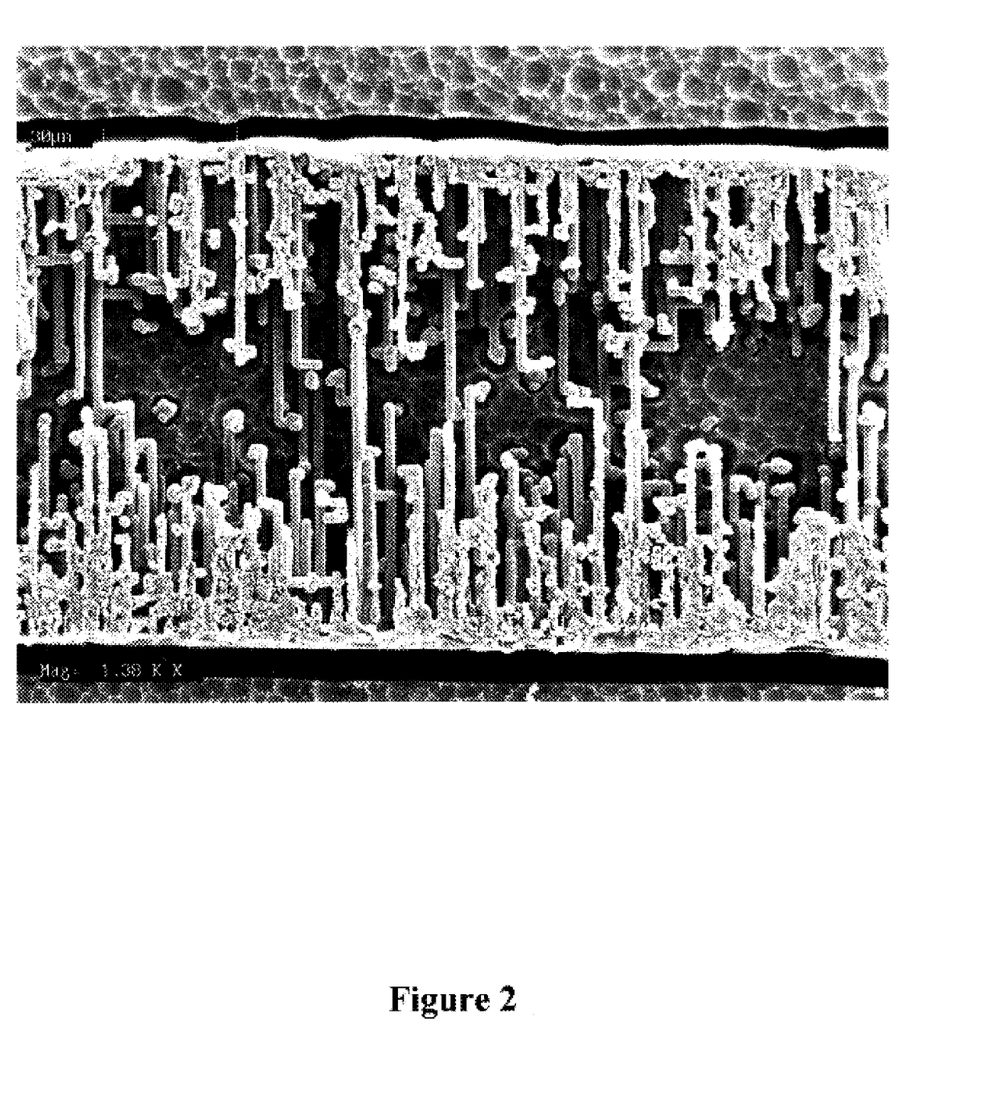
FIG. 2 shows an SEM picture of a of a foil etched according to the present invention in an etch solution having 5% glycerol.
Figure 3:
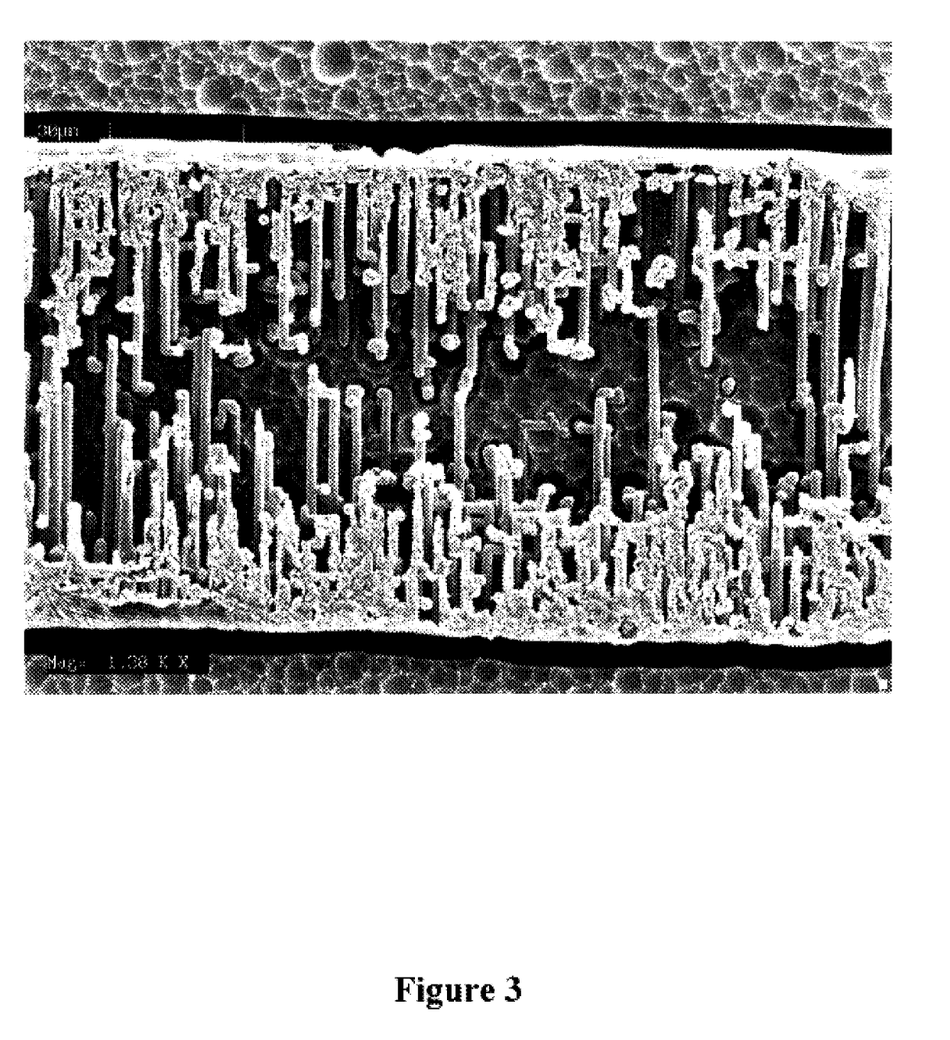
FIG. 3 shows an SEM picture of a of a foil etched according to the present invention in an etch solution having 10% glycerol.
Figure 4:
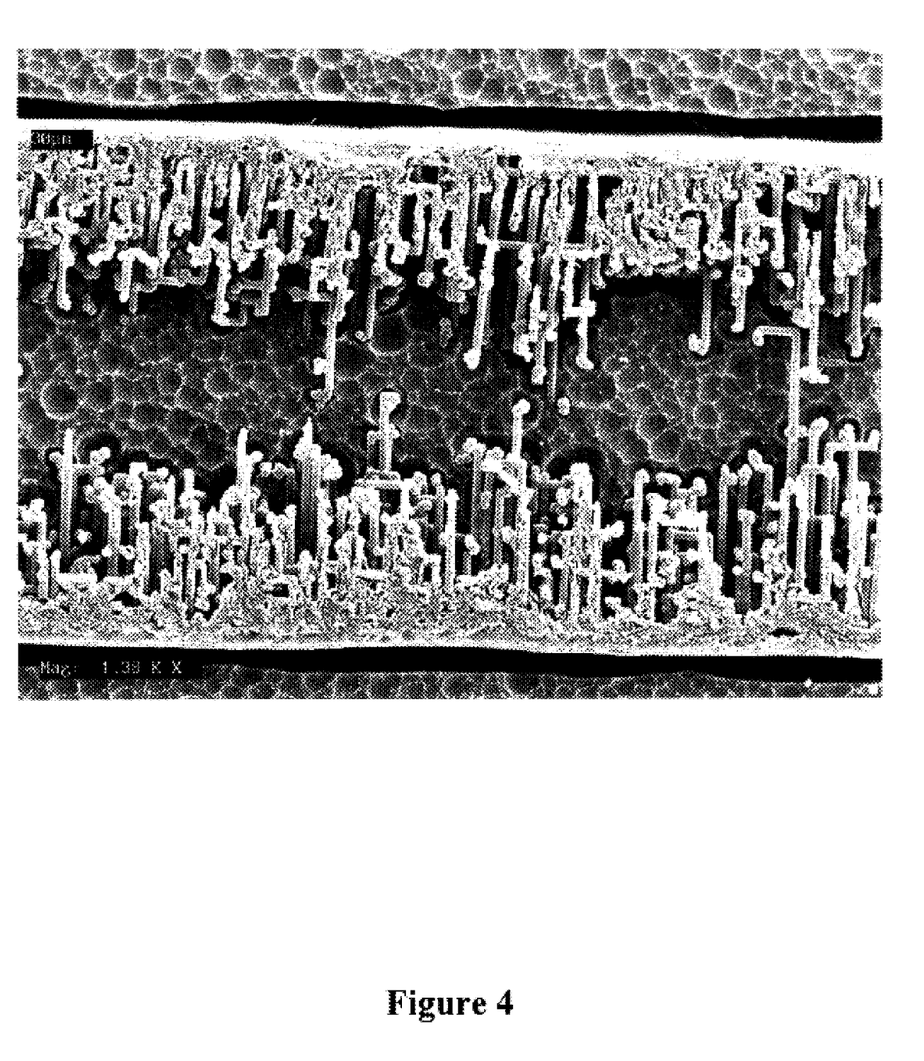
FIG. 4 shows an SEM picture of a of a foil etched according to the present invention in an etch solution having 20% glycerol.
Figure 5:
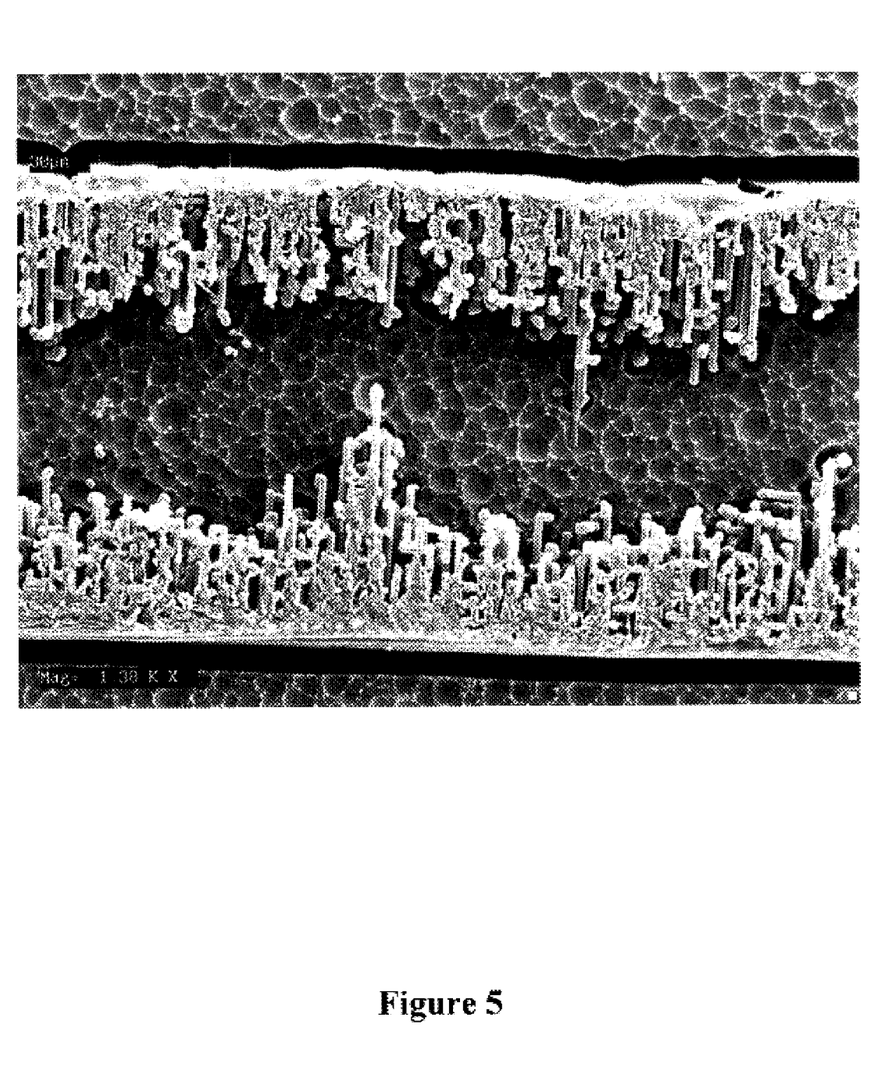
FIG. 5 shows an SEM picture of a of a foil etched according to the present invention in an etch solution having 30% glycerol.
Figure 6:
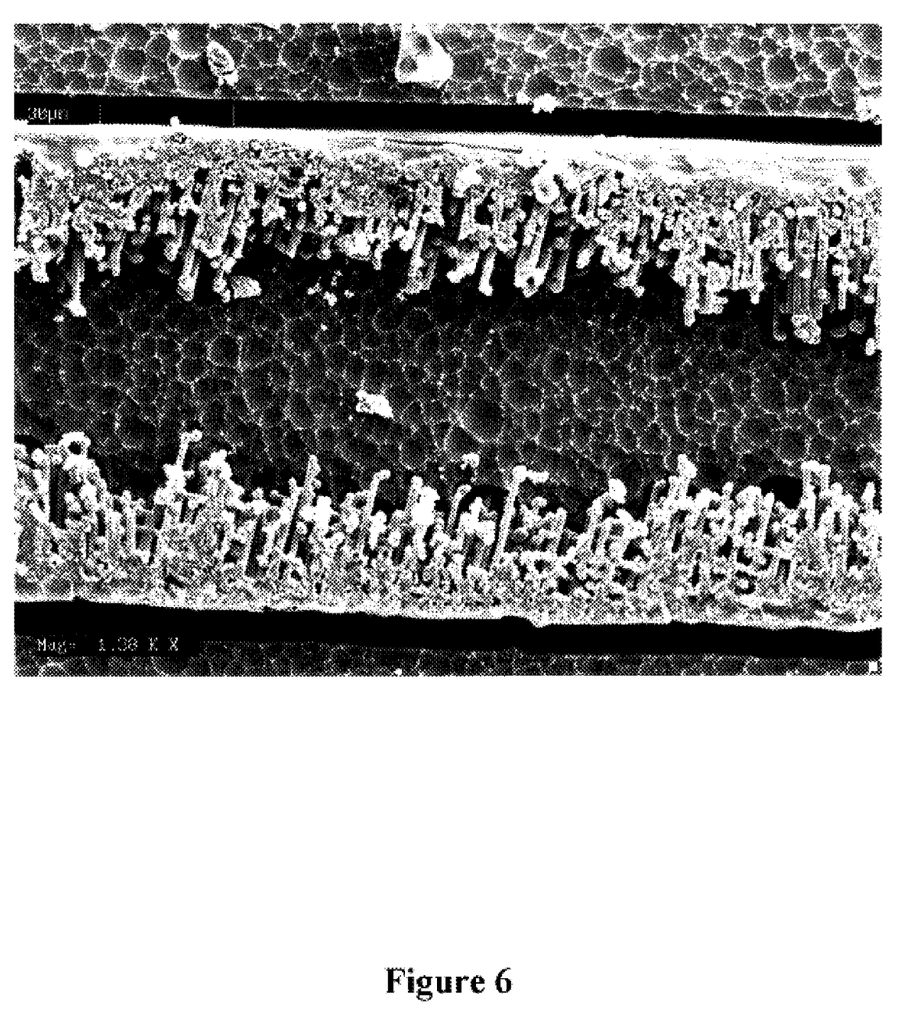
FIG. 6 shows an SEM picture of a of a foil etched according to the present invention in an etch solution having 40% glycerol.

FIGS. 1–6 show Scanning Electron Microscope (SEM) pictures of foil cross sections at the various glycerol concentrations. The pictures indicate tunnel length control by changing the glycerol percentage and consequently the viscosity of the etching solution. Increasing the glycerol percentage in the etch solution causes a thicker web in the center of the foil via shorter tunnel lengths.

All references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for etching an anode foil, comprising
   (a) treating said anode foil in an electrolyte bath composition containing; a surface active, viscosity modifying agent, wherein said surface active, viscosity modifying agent promotes tunnel initiation during said etching process; and
   (b) passing a charge through said anode foil, while said foil is immersed in said electrolyte bath;
   such that said anode foil is etched.

2. A process according to claim 1, wherein said electrolyte bath composition comprises 0.5–50.0 percent by weight of said surface active, viscosity modifying agent.

3. A process according to claim 1, wherein said surface active, viscosity modifying agent is glycerol.

4. A process according to claim 1, wherein said surface active, viscosity modifying agent is ethylene glycol.

5. A process according to claim 1, wherein said surface active, viscosity modifying agent is butoxyethanol (butyl cellosolve).

6. A process according to claim 1, wherein the temperature of said electrolyte bath is 80–95° C.

7. A process according to claim 1, wherein said charge is a direct current (DC) charge.

8. A process according to claim 7, wherein said DC charge has current density of 0.1–0.3 A/cm².

9. A process according to claim 7, wherein said DC charge is 20–100 coulombs/cm².

10. A process according to claim 1, wherein said charge is an alternating current (AC) charge.

11. A process according to claim 1, wherein said anode foil is aluminum anode foil.

12. Etched anode foil, provided by a process for etching an anode foil, comprising
    (a) treating said anode foil in an electrolyte bath composition containing a surface active, viscosity modifying agent, wherein said surface active, viscosity modifying agent promotes tunnel initiation during said etching process; and
    (b) passing a charge through said anode foil, while said foil is immersed in said electrolyte bath;
    such that said anode foil is etched.

13. Etched anode foil according to claim 12, wherein said anode foil is aluminum anode foil.

14. An electrolyte bath composition for etching anode foil, comprising a surface active, viscosity modifying agent, wherein said surface active, viscosity modifying agent promotes tunnel initiation during the etching process.

15. A composition according to claim 14, wherein said electrolyte bath composition comprises 0.5–50.0 percent by weight of surface active, viscosity modifying agent.

16. A composition according to claim 14, wherein said surface active, viscosity modifying agent is glycerol.

17. A composition according to claim 14, wherein said surface active, viscosity modifying agent is ethylene glycol.

18. A composition according to claim 14, wherein said surface active, viscosity modifying agent is butoxyethanol (butyl cellosolve).

19. An electrolytic capacitor comprising anode foil, wherein said anode foil is etched by a process comprising
    (a) treating said anode foil in an electrolyte bath composition containing a surface active, viscosity modifying agent, wherein said surface active, viscosity modifying agent promotes tunnel initiation during said etching process; and
    (b) passing a charge through said anode foil, while said foil is immersed in said electrolyte bath;
    such that said anode foil is etched.

20. An electrolytic capacitor comprising anode foil according to claim 19, wherein said anode foil is aluminum anode foil.

21. An electrolytic capacitor comprising etched anode foil, provided by a process for etching an anode foil, comprising
    (a) treating said anode foil in an electrolyte bath composition containing a surface active, viscosity modifying agent, wherein said surface active, viscosity modifying agent promotes tunnel initiation during said etching process; and
    (b) passing a charge through said anode foil, while said foil is immersed in said electrolyte bath;
    such that said anode foil is etched.

22. An electrolytic capacitor comprising etched anode foil according to claim 21, wherein said anode foil is aluminum anode foil.

* * * * *